Figure 1:
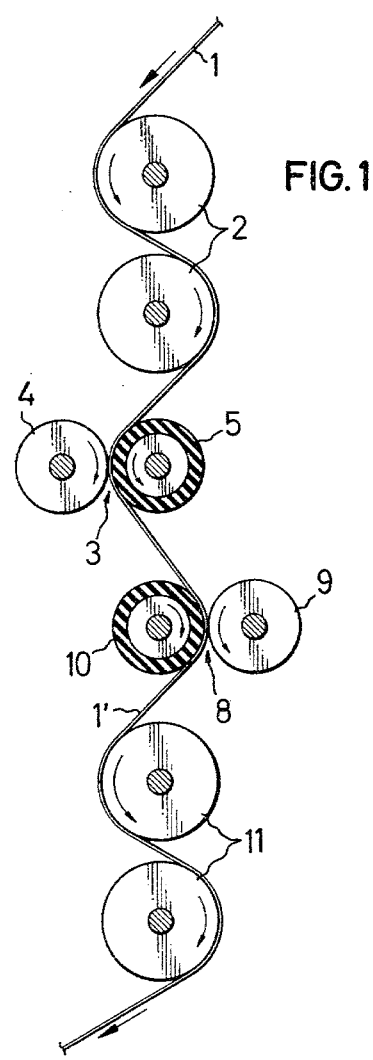

United States Patent [19]
Baumgartl et al.

[11] 4,259,285
[45] Mar. 31, 1981

[54] PROCESS FOR EMBOSSING POLYVINYLCHLORIDE SHEETS

[75] Inventors: Wilhelm Baumgartl, Hart; Hermann Funke, Altötting; Ulrich Reiff, Neuötting; Franz Scheier, Burgkirchen, all of Fed. Rep. of Germany

[73] Assignee: Hoechst Aktiengesellschaft, Fed. Rep. of Germany

[21] Appl. No.: 61,940

[22] Filed: Jul. 30, 1979

[30] Foreign Application Priority Data

Aug. 3, 1978 [DE] Fed. Rep. of Germany ....... 2833982

[51] Int. Cl.³ ............................................. B29C 17/00
[52] U.S. Cl. .................................................. 264/284
[58] Field of Search ...................... 264/284, 293, 210.2

[56] References Cited

U.S. PATENT DOCUMENTS

| | | |
|---|---|---|
| T927,010 | 10/1974 | Whitfield et al. ............... 264/284 |
| 2,551,966 | 5/1951 | Pierce ............................... 264/284 |
| 2,976,567 | 3/1961 | Jones et al. ...................... 264/284 |
| 3,176,058 | 3/1965 | Mittman ............................ 264/284 |
| 3,246,365 | 4/1966 | Kloender .......................... 264/284 |
| 3,842,152 | 10/1974 | Witfield, Jr. et al. ............ 264/284 |
| 3,882,207 | 5/1975 | Hannan et al. .................... 264/284 |

FOREIGN PATENT DOCUMENTS

1779204 9/1971 Fed. Rep. of Germany.

OTHER PUBLICATIONS

*Chemische Industrie*, vol. 7–12 Jul.–Dec. 1951, pp. 698–699.

*Primary Examiner*—James B. Lowe
*Attorney, Agent, or Firm*—Connolly and Hutz

[57] ABSTRACT

According to the improved process sheets of thermoplastic material are embossed especially on both faces by means of a pair of embossing rollers in such a manner that the embossing roller is maintained at a temperature within the plastic temperature range of the thermoplastic material, and the sheet forwarded to the roller has a temperature in the range of from the second order transition temperature of the thermoplastic material and a temperature superior to it by about up to 70° C.; the sheet being forwarded at a speed of from 5 to 200 m/min and subjected to an embossing pressure of from 100 to 500 N/cm. This process prevents undesirable alteration of the pattern first embossed in the second embossing operation in the case of double-face embossment of the sheet. The embossed sheets may be applied for decoration purposes or the coating of furniture, as well as for writing.

2 Claims, 2 Drawing Figures

PROCESS FOR EMBOSSING POLYVINYLCHLORIDE SHEETS

The invention relates to a process for embossing a sheet of thermoplastic material by passing the sheet between a pair of embossing rollers, thus engraving the pattern of the embossing roller in the sheet at shaping temperature and under pressure while turning the pair of embossing rollers in the direction and at the speed of the moving sheet, and by heating the embossing roller to a temperature above that of the sheet forwarded to the pair of rollers.

It is known that sheets of thermoplastic material can be embossed by passing the corresponding sheet between a pair of rollers, that is, an embossing roller and a counter roller, which rollers turn in the direction and at the speed of the sheet, whereby the pattern of the embossing roller is engraved under pressure in the sheet at the shaping temperature thereof (K. Krekeler and G. Wick, Kunststoff-Handbuch, vol. II, Polyvinylchlorid, part 1, pp. 370-371, and part 2, pp. 256-257, Ed. Hanser, Munich 1963; Kunststoffe, vol. 42, 1952, 10, pp. 352-353; Chemische Industrie, July/December 1951, pp. 698-699; German Auslegeschrift No. 11 26 126).

In this process, before passing the sheeting through the embossing gap between the pair of rollers, it is heated to a temperature within its elastic temperature range. While passing through the embossing gap, the pattern of the embossing roller which has preferably a temperature of from 20° to 70° C. and the pressure of which is adjustable is engraved in the heated sheet. The hot sheet is cooled rapidly by the relatively cold embossing roller, and the stiffening sheet thus ensures that the dimensional stability of the engraved pattern is maintained. The disadvantage of this process resides in the fact that the sheeting must be heated to highly elevated temperatures, which means a considerable consumption of energy, especially in the case of thick sheets. Furthermore, if, after having been passed through an embossing gap where one surface is embossed, the sheet is to be passed between a second pair of embossing rollers in order to engrave the other surface, too, the sheet cooled by the first embossing roller must be heated anew to the required elevated temperature, which, of course, causes the pattern on the face embossed first to be destroyed again due to the elastic resilience set free by the required temperature. According to the known embossing process it is therefore impossible to manufacture sheets which are well embossed on both faces. Even in the case of unilaterally embossed sheets the engraved pattern may vanish on thermal processing of the sheets (for example deep-drawing, drying).

It has now been found that this disadvantage involved in the known embossing process can be surprisingly prevented by heating the embossing roller to a temperature within the plastic temperature range of the sheet and by maintaining the sheeting forwarded to the embossing gap at a comparatively low temperature.

There has been found accordingly a process for embossing a sheet of thermoplastic material by passing the sheet between a pair of embossing rollers, thus engraving the pattern of the embossing roller in the sheet at shaping temperature and under pressure while turning the pair of embossing rollers in the direction and at the speed of the moving sheet, and by heating the embossing roller to a temperature above that of the sheet forwarded to the pair of rollers, which comprises heating the embossing roller to a temperature within the plastic temperature range of the plastic material, and heating the sheet forwarded to the pair of embossing rollers to a temperature within the range of from about the second order transition temperature of the plastic material to a temperature superior to the latter one by about 70° C., and passing the sheet through the gap of the pair of rollers at a speed of from 5 to 200 m/min and under an embossing pressure of from 100 to 500 N/cm of sheet width.

In the above reference in Chemische Industrie the possibility of embossing thermoplastic sheets is hinted to; the sheeting being cold and the embossing roller being heated (that is, the embossing roller is heated to a temperature above that of the sheet forwarded to the pair of embossing rollers). However, the process of the invention which is distinguished by a combination of selected process parameters cannot be inferred from this vague and generalized remark, especially in view to the fact that this reference recommends and describes in detailed manner the embossing process referred to above, that is, in which the sheet to be embossed is heated to a temperature being in the elastic temperature range of the sheet, and the embossing roller is cooled.

In contrast thereto, according to the process of the invention the embossing roller is heated to a temperature within the plastic temperature range of the material the sheet consists of. As is known, the plastic temperature range of thermoplastic materials is that range within which the sheet can be shaped without formation of a significant molecule orientation, that is, without alteration of the mechanical properties.

In accordance with thermoplastic sheets manufactured or obtainable by calendering or extrusion, in the process of the invention the embossing roller is therefore heated preferably to about 150° to 250° C., especially 170° to 230° C., which heating is advantageously ensured by applying a heating agent to the roller, for example steam, hot oil or electric energy.

In accordance with this invention, the temperature of the plastic sheet forwarded to the pair of embossing rollers is in a range which is limited on the one hand by about the second order transition temperature of the plastic material, and on the other hand by a temperature superior to the first one by about 70° C., preferably 10° to 40° C. The second order transition temperature of thermoplastic materials and thus of the sheet manufactured therefrom is a characteristic value known from the literature (see H. A. Stuart, Die Physik Der Hochpolymeren, vol. 4, Ed. Springer, Berlin 1956, pp. 16-19; J. Brandrup and E. H. Immergut, Polymer Handbook, 2nd ed., Wiley-Interscience, New York, 1975). The sheet may be heated by contact on rollers the interior of which is heated, and/or by radiation heating, for example infrared radiation.

The sheets to be embossed according to the invention are manufactured for example from homopolymers, copolymers or graft copolymers of vinyl chloride having at least 50 weight % of polymerized vinyl chloride or from mixtures of these vinyl chloride polymers with other polymers which mixtures contain at least 60 weight %, relative to the sum of polymers, of the above vinyl chloride polymers. For embossing such sheets, the embossing roller is heated to 150°-230° C., preferably 170°-210° C., and the sheet forwarded to the pair of embossing rollers is heated to 70°-130° C., preferably 90°-120° C.

When embossing sheets which, for example, consist substantially (more than 60 weight %) of polyolefins such as polyethylene or polypropylene, or of acrylonitrile/butadiene/styrene polymers (so-called ABS resins), the embossing roller is heated to 150°–190° C., preferably 160°–180° C., and the sheet to 80°–130° C., preferably 90°–120° C.

In the case of sheets consisting substantially of, for example, polyamide, the embossing roller is heated to 180°–200° C., preferably 190°–195° C., and the sheet to 100°–130° C., preferably 115°–125° C.

In accordance with the process of the invention, the pair of embossing rollers consists of an embossing roller, preferably a steel roller having a diameter of from about 150 to 300 mm, provided with the pattern, and a counter roller having a diameter preferably of from about 150 to 300 mm, provided with a smooth, elastic surface, advantageously a smooth jacket of soft rubber. Advantageously, the counter roller is cooled (for example by means of water) in order to ensure its surface not to be heated to a temperature above 140° C. Generally, the temperature of the counter roller is from about 20° to 130° C., preferably 70° to 110° C.

The sheet to be embossed is passed through the gap between the pair of rollers at a speed of from 5 to 200 m/min, preferably 10 to 50 m/min, and it is subjected in this operation to a pressure of from about 100 to 500 N/cm of sheet width, preferably about 250 to 400 N/cm of sheet width, while the pattern is engraved. The pressure is applied to the sheet by compressing the steel roller (embossing roller) and the rubber roller (counter roller). This compression is generally carried out by hydraulic, pneumatic or mechanical means, and can be controlled.

If, in accordance with the process of the invention, the sheet is to be embossed on both faces, it is passed, after having left the first embossing gap, through a second gap under nearly identical conditions. This second gap is formed by a pair of embossing rollers identical to the first ones; however, embossing roller and counter roller are arranged in such a manner that the sheet is embossed on that face which has been left bare in the first embossing gap. The distance between the two pairs of embossing rollers is generally from 50 to 500 mm, preferably 100 to 250 mm. In order to ensure the sheet to be forwarded to the second embossing gap at the temperature required according to the invention, it may optionally be passed through a heating or cooling device after having left the first embossing gap.

Figure 2:
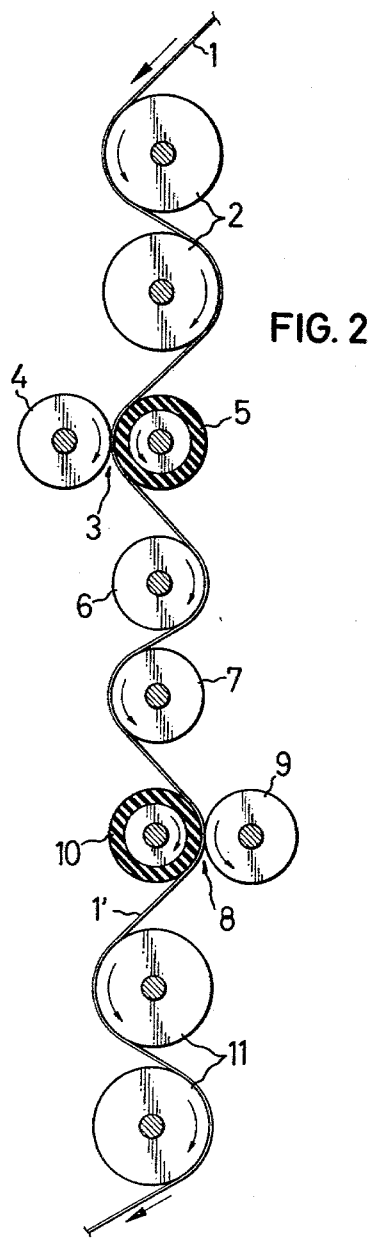

The process of the invention (double-face embossment) will be better understood by reference to the accompanying drawing, in which FIGS. 1 and 2 represent a schematic view of the process of double-face embossment in accordance with this invention, using a suitable apparatus which, however, is different in each case.

In FIG. 1, the thermoplastic sheet 1 coming for example from a calender or extruder, a drawing zone or a winder roll, in order to adjust its temperature in the range of from about the second order transition temperature of the plastic material to a temperature superior by about 70° C. (if necessary), is passed over a heating or cooling device, for example a pair of cooling or heating rollers 2. Subsequently, the sheet passes through the embossing gap 3 of the pair of embossing rollers (turning in the direction and at the speed of the moving sheet) consisting of the embossing roller 4 (for example a sandblasted steel roller) and the rubber roller 5 (for example rubber having a Shore A hardness of about 65), in which operation it is embossed on the side facing the embossing roller 4. Advantageously, the sheet 1 is passed through the gap 3 without wrapping the roller 4 and with wrapping of the roller 5 (preferably at an angle of from 90° to 180° C.). The embossing roller 4 is heated to a temperature within the plastic temperature range of the sheet 1. After the sheet 1 has passed between the first pair of embossing rollers and thus is embossed on one face, it is passed through the embossing gap 8 of the second pair of embossing rollers (turning likewise at the speed and in the direction of the moving sheet), consisting of the embossing roller 9 and the counter roller 10 (both rollers are identical with the rollers 4 and 5; they are, however, inversely arranged), thus becoming embossed on the other face. After having left the second embossing gap 8 (the wrap being the same as in the case of the first pair of embossing rollers), the bilaterally embossed sheet 1' is preferably passed through a cooling device, for example a pair of cooling rollers 11, where the sheet 1' is cooled to room temperature. Subsequently, the embossed sheet 1' is preferably forwarded to a winder device (not shown).

In FIG. 2, in modification of the process of FIG. 1, the sheet 1, after having left the embossing gap 3, is passed over a pair of rollers 6, 7, capable of heating or cooling, in order to readjust the temperature required for the second embossing operation in gap 8.

The embossing rollers 4 and 9, respectively, in FIGS. 1 and 2 are not driven; they turn by friction with the rubber rollers 5 and 10, respectively, on compression. All other rollers of FIGS. 1 and 2 are driven, for example by means of an electric motor.

As thermoplastic materials the sheets to be embossed according to the process of the invention consist of, there may be used:

olefin polymers such as polyethylene or polypropylene; styrene polymers; polymers of acrylonitrile/butadiene/styrene (ABS), methylmethacrylate/butadiene/styrene (MBS), methylmethacrylate/acrylonitrile/butadiene/styrene (MABS); polymers of acrylic or methacrylic acid esters such as polybutylacrylate or polymethylmethacrylate. Polymers derived from vinyl chloride, that is, vinyl chloride homo- or copolymers or graft copolymers of vinyl chloride and copolymerizable monomers having at least 50% by weight, relative to the polymer, preferably from 95 to 80% by weight of polymerized vinyl chloride are particularly suitable. Suitable comonomers are for example olefins and diolefins, such as ethylene, propylene, butadiene; vinyl esters of straight-chain or branched carboxylic acids having 2 to 20, preferably from 2 to 4 carbon atoms, such as vinyl acetate, vinyl propionate, vinyl butyrate, vinyl stearate; vinyl or vinylidene halides, such as vinyl fluoride, vinylidene fluoride, vinylidene chloride; vinyl ethers; unsaturated acids, such as maleic, fumaric, acrylic and methacrylic acid, and the mono- or di-esters thereof with mono- or di-alcohols having from 1 to 10 carbon atoms; acrylonitrile, styrene or cyclohexyl maleimide. The polymers on the basis of vinyl chloride generally have a K value according to Finkentscher of from 50 to 80, preferably of from 55 to 70.

Alternatively, mixtures of the cited thermoplastics polymers may be used. Preferred are mixtures of vinyl chloride homo-, co- or graft copolymers with so-called resilient resins such as the above ABS, MBS and MABS polymers, or chlorinated polyethylene and, optionally, with so-called processing aids, for example low molecular weight polymethylmethacrylate; the amount of resilient resins and processing aids being preferably from 1 to 15% by weight, relative to the vinyl chloride polymer.

Advantageously, processing additives such as heat and light stabilizers, lubricants, and optionally further special additives such as dyestuffs, pigments, optical brighteners and antistatics are added to the thermoplastic materials. Preferably, polymers having no plasticizer are used; however, the process may also be carried out in the presence of usual amounts of plasticizers.

Suitable heat stabilizers include, for example, mono- and dialkyl-tin compounds, the alkyl groups of which having from 1 to 10 carbon atoms and the remaining valencies of the tin being linked via oxygen and/or sulfur atoms to further substituents; amino-crotonic acid esters; urea and thiourea derivatives; $\alpha$-phenylindole; salts of alkaline earth metals and of zinc or cadmium with aliphatic carboxylic acids or hydroxycarboxylic acids. Organo-tin/sulfur stabilizers such as dimethyl-tin-bis-(2-ethylhexylthioglycolate), di-n-butyl-tin-bis-(2-ethylhexylthioglycolate), di-n-octyl-tin-bis-(2-ethylhexylthioglycolate) are preferably employed. The stabilizers may be used in quantities of from 0.2 to 3% by weight calculated on the thermoplastic material; it is also possible to use them in admixture with one another and with usual co-stabilizers and antioxidants.

Lubricants may also be used, in quantities of from 0.1 to 4% by weight, calculated on the thermoplastic material, such as one or more higher aliphatic carboxylic acids and hydroxycarboxylic acids as well as the esters and amides thereof, such as stearic acid, montanic acid, bis-stearoylethylenediamine or bis-palmitoylethylenediamine, montanic acids esters of ethanediol or 1,3-butanediol, optionally partially saponified; fatty alcohols having more than 10 carbon atoms as well as the ethers thereof, low molecular weight polyolefins and hard paraffins.

The thermoplastic materials may contain plasticizers in quantities of from 10 to 40% by weight, calculated on the thermoplastic material, for example, one or more esters of aromatic or aliphatic di- and tri-carboxylic acids, of higher alkylsulfonic acids and of phosphoric acid, such as di-2-ethylhexylphthalate, adipate, or sebacate; alkylsulfonic acid esters of phenol or cresol; tricresyl phosphate or epoxidized soya bean oil or castor oil.

The mixtures (plastics compositions) made of thermoplastic material in powdered form, processing aids and optionally further additives may be prepared by thorough mixing of the components, for example in one of the high speed mixers usual in plastics processing.

The sheets can be manufactures from the thermoplastic materials or their mixtures according to usual processes, for example by calendering, or extrusion on wide slot nozzle extruders or circular nozzle extruders having a flattening device.

The thickness of the sheets embossed in accordance with the process of the invention is generally from 0.050 to 1 mm. Preferably, relatively thick sheets, that is, those having a thickness of from 0.200 to 1 mm, preferably 0.300 to 0.700 mm, are embossed according to the process of the invention.

The process of the invention is distinguished by several advantages. As compared to known embossing processes for thermoplastic sheets, it saves energy, because heating of the embossing roller to the highly elevated shaping temperatures requires much less energy than a corresponding heating of the moving sheet. Moreover, the novel embossing process is especially advantageous because the embossed pattern is maintained in any heat treatment of the embossed sheetings, for example deep-drawing or drying operations. Furthermore, the process of the invention is versatile: it allows unilateral or bilateral embossment of sheets which are directly taken off from corresponding manufacturing equipment, for example a calender, a wide slot nozzle extruder or circular nozzle extruder with flattening device, as well as of sheets which have been obtained according to any sheet manufacturing process and which are wound up or stored for a certain time.

The novel embossing process is especially suitable for double-face (bilateral) embossing of thermoplastic sheets, because the pattern of the face which is embossed first is surprisingly not adversely affected by embossment of the other face of the sheet.

The kind of pattern applied onto the embossing roller is not critical for the process of the invention, and it may have any shape whatsoever. Preferably, the embossing roller has a pattern obtained by sandblasting thus giving sheets having a uniformly dull (rough) surface on one or both sides.

The sheets embossed in accordance with this invention may be used for various applications, for example as decoration or coating sheets for furniture, upholstery, ceilings a.s.o. In the case where the sheet is embossed by means of sandblasted embossing rollers, it may be used alternatively as sheet for credit cards or for writing, because the uniformly rough, dull surface allows printing or writing on it by pencil, ink or other writing means.

The following examples illustrate the invention by reference to FIGS. 1 and 2.

EXAMPLE 1

For embossing, a sheet having a thickness of 0.600 mm and made of unplasticized polyvinyl chloride (consisting substantially of 80 parts by weight of a copolymer having a K value of 60 and containing 90 parts by weight of vinyl chloride and 10 parts by weight of vinyl acetate, 18 parts by weight of an acrylonitrile/butadiene/styrene copolymer normally used as resilience modifier, and small amounts of a usual lubricant and tin stabilizer) is used.

The sheet is embossed on both faces on the apparatus according to FIG. 1 under the following conditions:
Speed of the moving sheet: 25 m/min
Temperature of the sheet (heated by means of the pair of heating rollers 2): 110° C.
Temperature of the embossing rollers 4 and 9: 210° C.
Pressure (hydraulic by means of embossing roller 4 in the case of the first pair of embossing rollers 4, 5, and by means of the counter roller 10 in the case of the second pair of embossing rollers 9, 10): 360 N/cm in each case
Cooling of the embossed sheet to room temperature (about 25° C.) by means of the pair of cooling rollers 11.

EXAMPLE 2

A sheet having a thickness of 0.200 mm made of plasticized polyvinyl chloride (consisting substantially of 64 parts by weight of a vinyl chloride homopolymer having a K value of 70, 35 parts by weight of dioctyl phthalate as plasticizer and small amounts of a usual lubricant and a barium/cadmium stabilizer) is used for embossment.

The sheet is embossed unilaterally on the apparatus according to FIG. 2; the sheet after having been embossed in the first pair of embossing rollers 4, 5 being passed over the rollers 6 and 7 acting as cooling rollers, and subsequently being forwarded to a usual winder device:

Speed of the moving sheet: 15 m/min
Temperature of the sheet (heated by the pair of heating rollers 2): 90° C.
Temperature of the embossing roller 4: 175° C.
Pressure (hydraulic by means of embossing roller 4): 225 N/cm
Cooling of the embossed sheet to room temperature by means of the two rollers 6, 7 cooled to about 20° C.

EXAMPLE 3

A sheet having a thickness of 0.420 mm made of polypropylene (consisting substantially of a propylene homopolymer having a melt flow index of from 5 to 10 g/10 min, measured according to DIN 53 735 and the method of 230° C. and 21.6 kp) is used for embossing.

The sheet is bilaterally embossed on the apparatus according to FIG. 1 under the following conditions:

Speed of the moving sheet: 10 m/min
Temperature of the sheet (heated by the pair of heating rollers 2): 125° C.
Temperature of the embossing rollers 4 and 9: 165° C.
Pressure (hydraulic as in Example 1): 225 N/cm each
Cooling of the embossed sheet: as in Example 1

EXAMPLE 4

A sheet having a thickness of 0.090 mm made from polyethylene (consisting substantially of a high pressure polyethylene) is used for embossing. The sheet is embossed unilaterally on the apparatus according to FIG. 2 under the following conditions; the operations being as in Example 2:

Speed of the moving sheet: 5 m/min
Temperature of the sheet (heated by pair of heating rollers 2): 90° C.
Temperature of the embossing roller 4: 170° C.
Pressure (hydraulic by means of embossing roller 4): 280 N/cm
Cooling of the embossed sheet as in Example 2.

The sheets obtained in the Examples have a uniformly embossed pattern stable to heat, which pattern appears within a uniformly dull surface of the sheet.

What is claimed is:

1. In a process for embossing a sheet of vinyl chloride polymers having at least 80 to 95% by weight of polymerized vinyl chloride, by passing the sheet between a pair of rollers consisting of the embossing steel roller and the counter roller having a rubber jacket, whereby the pair of rollers turns in the direction and at the speed of the moving sheet, heating the embossing roller to a temperature of from 150° to 230° C., heating the sheet to a temperature below the temperature of the embossing roller and within the range of the shaping temperature of the sheet, and whereby the pattern of the embossing roller is engraved in the sheet with pressure, the improvement which comprises passing the sheet to be embossed between said pair of rollers
   (a) at a speed of from 10 to 50 m/min
   (b) at a temperature of from 70° to 130° C.
   (c) at a pressure of from 250 to 400 N/cm
   (d) at a wrapping degree of from 90 to 180 on the counter roller, which is heated at a temperature of from 70° to 110° C., and
   (e) without wrapping the embossing roller.

2. The process of claim 1, wherein said sheet is passed, after having left said pair of embossing rollers, between a further identical pair of embossing rollers, thus embossing that face of said sheet which has not been embossed in the first pair of embossing rollers.

* * * * *